United States Patent
Klompas

[11] 3,814,539
[45] June 4, 1974

[54] ROTOR SEALING ARRANGEMENT FOR AN AXIAL FLOW FLUID TURBINE

[75] Inventor: Nicholas Klompas, Lynnfield, Mass.

[73] Assignee: General Electric Company, Lynn, Mass.

[22] Filed: Oct. 4, 1972

[21] Appl. No.: 294,852

[52] U.S. Cl. .............................. 416/95, 416/220
[51] Int. Cl. ....................... F02d 5/08, F01d 5/18
[58] Field of Search.............. 416/95, 218, 219–221, 416/96, 97

[56] References Cited
UNITED STATES PATENTS

| | | | |
|---|---|---|---|
| 2,755,063 | 7/1956 | Wilkinson | 416/221 |
| 2,988,325 | 6/1961 | Dawson | 416/95 |
| 2,998,959 | 9/1961 | Haworth et al. | 416/221 |
| 2,999,668 | 9/1961 | Howald et al. | 416/97 |
| 3,017,159 | 1/1962 | Foster et al. | 416/90 |
| 3,096,074 | 7/1963 | Pratt et al. | 416/221 X |
| 3,137,478 | 6/1964 | Farrell | 416/220 |
| 3,266,770 | 8/1966 | Harlow | 416/220 |
| 3,295,825 | 1/1967 | Hall | 416/221 |
| 3,635,586 | 1/1972 | Kent et al. | 416/95 X |
| 3,728,042 | 4/1973 | Hugoson | 416/95 |

FOREIGN PATENTS OR APPLICATIONS

| | | | |
|---|---|---|---|
| 1,128,113 | 8/1956 | France | 416/218 |
| 1,134,832 | 12/1956 | France | 416/95 |

Primary Examiner—Everette A. Powell, Jr.

[57] ABSTRACT

A sealing arrangement around the periphery of a turbine rotor disc includes a seal ring with an integral circumferential flange extending axially therefrom for insertion within an axial groove around the rotor disc wherein locking engagement between the flange and groove is provided by insertion of a shear wire between the flange and groove.

10 Claims, 5 Drawing Figures

PATENTED JUN 4 1974 3,814,539
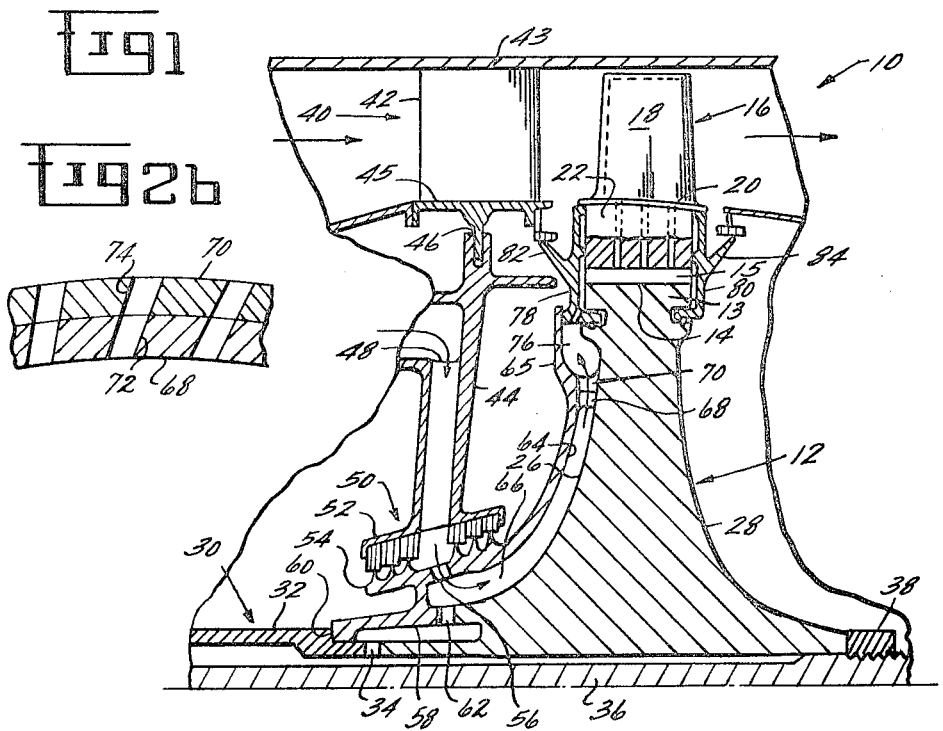
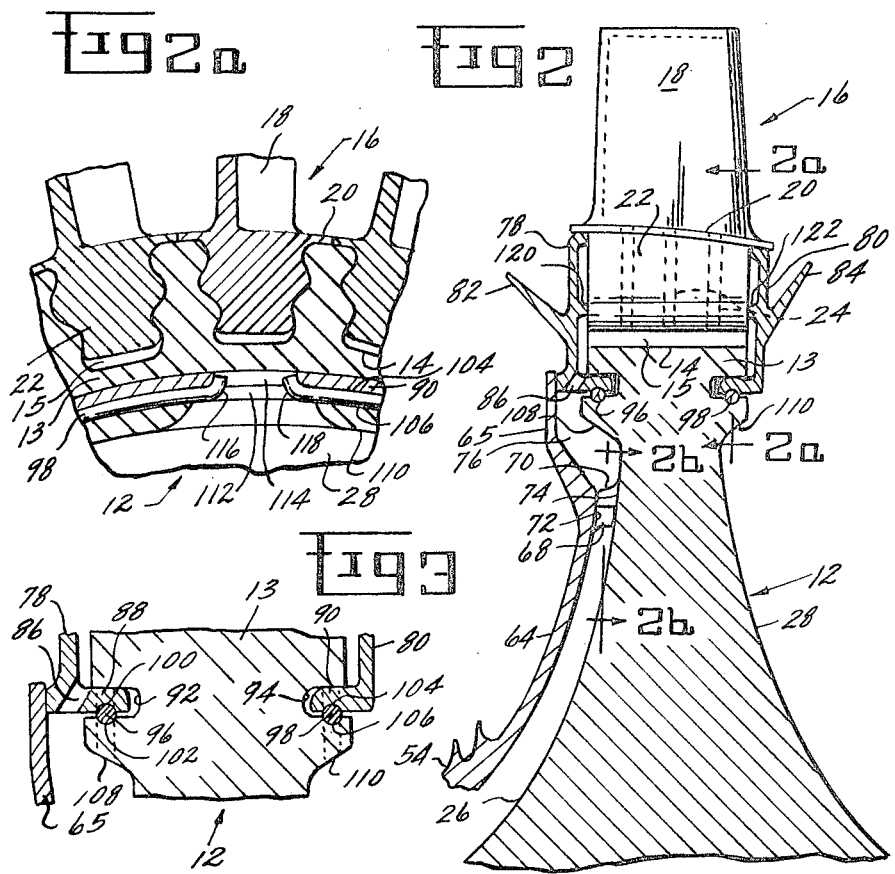

ROTOR SEALING ARRANGEMENT FOR AN AXIAL FLOW FLUID TURBINE

BACKGROUND OF THE INVENTION

This invention relates to a rotor sealing arrangement for an axial flow fluid turbine and, more particularly, to a circumferential heat shielding arrangement for the turbine rotor of a rotationally high speed gas turbine engine. The invention herein described was made in the course of or under a contract or subcontract thereunder (or grant) with the Department of the Air Force.

It is well known that the efficiency and output of a gas turbine engine can be increased by increasing the operating temperature of the turbine. As a practical matter, however, the turbine operating temperature, and hence the efficiency and output of the engine, is limited by the high temperature capabilities of the various turbine elements. Therefore, in order to maintain elements of the turbine at temperatures at which the materials have adequate strength to resist loads imposed during operation, various shielding arrangements have been suggested. These shielding arrangements are used to shield the turbine rotor disc and blade root elements from the high temperature motive fluid driving the turbine and to direct cooling air flow to these structural elements.

Cooling air flow is generally bled from a source of pressurized air such as the compressor air of a low temperature portion of the combustor. Since the engine performance theoretically possible is reduced by the bleeding off of cooling air, it is imperative that the cooling air be used effectively, lest the decrease in efficiency caused by extraction of the air be greater than the increase resulting from the higher turbine operating temperature. To this end, the shielding arrangement must not only provide cooling without excessive leakage, but should also be light-weight and have a high degree of structural reliability. This reliability and light-weight are not always easily attained in practice since at least a portion of the shielding structure is exposed to the high temperature gases during turbine operation and since the arrangement, as part of the rotor assembly, is driven at high rotary speeds.

Conventional means for attaching shielding arrangements to turbine rotors have generally involved the use of retaining bolts which engage the sealing structure at circumferentially spaced apart locations. High speed operation of the rotor, however, can create extremely high hoop stresses within the sealing structure which may become too great for the retaining bolts to withstand. Increasing the number and size of the retaining bolts only operates to increase the dead weight of the turbine and reduce the rotational speed of the turbine thereby decreasing the overall turbine efficiency.

Therefore, it is an object of this invention to provide an improved and light-weight shield arrangement for a high speed axial flow fluid turbine of the type generally utilized in a gas turbine engine.

It is also an object of this invention to provide an improved and light-weight shielding arrangement for a high speed turbine rotor without utilizing retaining bolts.

It is a further object of this invention to provide an improved and light-weight shielding arrangement for a turbine rotor which may readily withstand the high hoop stresses resulting from high speed operation of the turbine rotor.

SUMMARY OF THE INVENTION

In an axial flow fluid turbine of the type having a rotor disc together with a plurality of circumferentially spaced apart blades disposed about the periphery thereof, there is also provided a sealing arrangement around the rotor periphery. The sealing arrangement comprises an annular seal ring having a circumferential flange extending axially from the side thereof for engagement within a circumferential groove in the rotor disc. The circumferential groove extends axially into the face of the rotor disc. A shear wire is provided for engagement between first and second circumferential canals. The first circumferential canal is of generally semi-circular cross-section and extends entirely around the flange. The second circumferential canal is also of generally semi-circular cross-section and extends entirely around the inside surface of the first groove in opposing relation to the second circumferential canal. Means are also provided for inserting the shear wire between the first and second circumferential canals.

DESCRIPTION OF THE DRAWINGS

While the specification concludes with claims distinctly claiming and particularly pointing out the invention described herein, it is believed that the invention will be more readily understood by reference to the discussion below and the accompanying drawings in which:

FIG. 1 is a partial cross-sectional view of an axial flow fluid turbine together with a nozzle diaphragm as may be typically included in a gas turbine engine.

FIG. 2 is an enlarged cross-sectional view of the turbine of FIG. 1.

FIG. 2A is a partial cross-sectional view taken along the line 2A—2A of FIG. 2.

FIG. 2B is a partial cross-sectional view taken along the line 2B—2B of FIG. 2.

FIG. 3 is an enlarged cross-sectional view of a portion of FIG. 2.

DESCRIPTION OF THE PREFERRED EMBODIMENT

Referring to FIG. 1, there is shown an axial fluid flow turbine 10 having a rotor disc 12, the outer periphery 13 of which includes a plurality of circumferentially spaced apart axially extending dovetail grooves 14 which may be best seen in FIG. 2A. The dovetail grooves are provided to receive blades or buckets shown generally at 16, each one of which includes an airfoil portion 18 extending radially outward from a platform 20 formed integrally with an inner dovetail root portion 22. The blades 16 generally include a plurality of internal passages 24 as may be best seen in FIG. 2 wherein the passages receive a flow of cooling air in a manner to be made obvious from the following discussion.

Rotor disc 12 is of a type particularly adapted for operation at extremely high rotational speeds. To this end the forward and aft faces 26, 28 of the rotor disc 12 have been made to diverge in a radially inward direction in order that the bulk of the rotor mass be closest to the axis of rotation, and thereby incur the least centrifugal loading. The axial flow turbine of this invention will be described in relation to a single stage application although more than one stage could be used with equal success.

Rotor disc 12 connects to a shaft, a portion of which is shown generally at 30. The shaft 30 extends forward to drive a compressor, not shown, as is common and well known in the gas turbine art. The compressor in turn supplies pressurized air to a combustor, also not shown, wherein fuel is combined with the pressurized air and ignited to supply the hot motive fluid to drive the turbine. Rotor shaft 30 includes an outer sleeve 32 which drivably engages the forward end of the rotor disc 12 by means of a curvic, or toothed, coupling 34. A tiebolt 36 extends through the sleeve 32 and through the rotor disc 12 engaging the aft end of the rotor disc 12 by means of a threaded lock nut 38 which couples the rotor disc 12, sleeve 32 and tiebolt 36 together in order that they rotate as a single unit.

The hot motive fluid is directed for impingement on the air foil portions 18 of the blades 16 by a nozzle diaphragm 40 which includes a plurality of circumferentially spaced apart vane members 42 extending radially outward from an inner annular shroud member 45 to an outer annular shroud member 43. The nozzle diaphragm 40 is maintained in a fixed relation relative to a stationary engine frame member 44, only a portion of which is shown in FIG. 1, by means of a floating ferrule 46 which accommodates both circumferential and radial thermal growth. The floating ferrule 46 maintains the concentricity of the nozzle diaphragm 40 with respect to the center axis of the frame member 44. Frame member 44 includes a plurality of cooling air passages 48 for directing a cooling air flow to the fluid flow turbine 10. Cooling air can be bled from the compressor and diverted to the air passages 48 by conventional means well known to the gas turbine engine art.

An air seal 50 is provided at the outlet end of passageway 48 between the rotating and stationary members. Seal 50 is of the well known labyrinth type, and includes a stator member 52 which may be integrally formed with the frame 44. The stator member 52 engages the revolving teeth of a rotational member 54 and cooling air flow is ducted through the rotational member 54 by a plurality of circumferentially spaced apart passages 56, from whence the cooling air enters a plenum 66. The rotational seal member 54 is connected for rotation with shaft 30 by means of an interior ring member 58 formed integrally therewith. Ring member 58 may be slid over sleeve 32 into abutting engagement with a shoulder 60 formed around the sleeve. The aft face of the ring member 58 is engaged by the rotor disc 12 through a curvic, or toothed, coupling 62 which insures rotation of the ring member 58 with the rotor disc 12.

The aft side of the rotational seal member 54 flares radially outward to form a generally bowed conical seal plate 64 in close spaced apart relation to the forward face 26 of the rotor disc 12. The plenum 66 is defined by seal plate 64 in cooperation with the forward face 26 of the rotor disc 12 wherein the plenum operates to direct the cooling air flow radially outward toward the air foil portions 18 of the turbine blades 16. Referring now to FIG. 2, seal plate 64 includes an axially extending circumferential flange 68, the overlying surface of which engages the underlying surface of second axially extending circumferential flange 70 formed integral to the rotor disc 12. As may be best seen by the reference to FIG. 2B, circumferential flanges 68, 70 include aligned and tangentially slanted indentations 72, 74 respectively in order to facilitate the vortical flow of cooling air radially outward into a second annular plenum 76 defined by the outer periphery 65 of the seal plate 64 and the rotor disc 12. Engagement of the circumferential flange 68 against the circumferential flange 70 provides for radial constraint of the outer periphery of the flared sealing plate 64 during rotation. Axial constraint of the flared sealing plate 64 is provided by abutting engagement of the shoulder 60 against the interior ring member 58. It will be noted that the flared sealing plate 64 is maintained in compression by the shoulder 60 which provides an axial force operating against the inner periphery of the sealing plate and by the abutting flanges 68, 70 which provide a radially inward force operating substantially against the outer periphery of the sealing plate. This arrangement for attaching the sealing plate 64 provides for an extremely reliable constraint of the sealing under high centrifugal loading and is a significant departure from conventional means for attaching such plates.

Turning now to FIGS. 2, 2A, and 3 there can be seen the forward and aft seal rings 78, 80. The seal rings 78, 80 include circumferential axially extending flanges 82, 84 respectively which form close clearances with the stationary diaphragm member to prevent the flow of hot motive fluid radially between the rotor and diaphragm. The forward seal ring 78 includes a plurality of passages 86 in substantial alignment with the dovetail grooves 14 so as to direct a cooling air flow from the plenum 76 into spaces 15 which underlie the blade roots 22 in the dovetail grooves 14. From the spaces 15 cooling air flow circulates through the passages 24 cooling the blades 16 and finally discharging from the air foil portion 18 into the stream of motive fluid.

The forward and aft seal rings 78, 80 are retained relative to the rotor disc 12 in the following manner. The forward seal ring 78 includes a circumferential flange 88, extending axially from the inside edge thereof, for engagement within a circumferential groove 92 which extends axially into the rotor disc 12 and around the periphery 13 thereof. The circumferential flange 88 is maintained in locked engagement within the groove 92 by means of a shear wire 96 which engages flange 88 around a circumferential canal 100 of generally semi-circular cross-section. Shear wire 96 in like manner engages the rotor disc 12 around a circumferential canal 102 which is also semi-circular in cross-section and which extends around the inside surface of groove 92 in opposing relation to the canal 100.

Referring now to the aft seal ring 80, it can also be seen to include a circumferential flange 90 axially extending from the inside edge thereof into a circumferential groove 94 around the periphery of the rotor disc 12. Another shear wire 106 locks the flange 90 within the groove by insertion between semi-circular aligned circumferential canals 104, 106. It can now be readily seen that the seal rings 78, 80 are maintained in continuous circumferential engagement to the periphery of the rotor disc 12, and that during high rotational speeds, the resulting centrifugal loading and hoop stresses are uniformly constrained around each circumference by flanges 88 and 90 respectively. The flanges 88, 90 can be made substantially lighter in comparison to the weight of the corresponding number of retaining bolts which would be required to effect the same constraint thereby permitting the design of a more compact and efficient turbine.

Referring now to FIG. 2A, there may be seen the means by which the shear wire 106 can be inserted between the two semi-circular canals 104 and 106. Immediately adjacent the groove 94 of the rotor disc 12, there is formed an axially extending circumferential lip 110, one portion of which is cut away to form an opening 112. Opening 112 provides access for the insertion of shear wire 106 between the semi-circular canals 104 and 106. Once the shear wire 106 has been inserted a full 360°, the ends may be bent radially outward through another opening 114 in the circumferential flange 90 wherein the bent ends of the shear wire are shown at 116 and 118. Bending the ends of the shear wire 106 radially outward as shown prevents circumferential slippage of the shear wire as may occur during engine operation due to engine vibration or otherwise. The ends 116, 118 of the shear wire 106 could alternatively be bent radially inward through the opening 112 although centrifugal force would tend to unbend the wires in an outward radial direction. Also, it is to be understood that the shear wire could be formed from a number of segments individually inserted through the opening 112. Means for inserting the shear wire 96 between the semi-circular circumferential canals 100, 102 is provided in the same manner as previously described in relation to shear wire 98.

The seal rings 78, 80 extend entirely around the periphery of the rotor disc 12 and engage the axial ends of the blade root portions 24 confining the blades within the dovetail grooves 14 around the rotor periphery 13. Circumferential slippage of the seal rings 78, 80 with respect to rotor disc 12 is prevented by means of locating lugs 120, 122 respectively, which mate with corresponding receiving holes in the rotor disc periphery. In this manner the annular seal rings 78, 80 shield the rotor periphery 13 and the blade root portions 22 from direct contact with the hot motive fluid.

Having above described preferred embodiments of the invention, though not exhaustive of all possible equivalents, what is desired to be secured by Letters Patent is distinctly claimed and particularly pointed out in the claims appearing below.

What is claimed is:

1. In an axial flow fluid turbine of the type having a rotor disc together with a plurality of circumferentially spaced apart blades disposed about the outer periphery thereof, sealing means around the rotor periphery comprise:
   an annular seal ring having a circumferential flange extending axially from the side thereof for engagement within a circumferential groove which extends axially into the rotor disc, and
   a shear wire for engagement between a first circumferential canal of generally semi-circular cross-section which extends entirely around the flange, and a second circumferential canal also of generally semi-circular cross-section which extends entirely around the inside surface of the first groove, and
   means for inserting the shear wire between the first and second circumferential canals.

2. The turbine of claim 1 wherein the means for inserting the shear wire includes an opening through the rotor disc in communication with the second circumferential canal thereby permitting insertion of the shear wire between the first and second circumferential canals.

3. The turbine of claim 2 wherein the ends of the shear wire are bent radially outward through a second opening in the circumferential flange to inhibit circumferential slippage of the shear wire with respect to the seal ring and wherein at least one locating lug extends axially from the seal ring for engagement within a receiving hole in the rotor disc periphery to inhibit circumferential slippage of the seal ring with respect to the rotor disc.

4. The turbine of claim 1 including a generally bowed conical seal plate in axially spaced relation to the turbine disc defining a plenum therebetween for receiving and directing a flow of cooling air radially outward to the turbine blades wherein retaining means for the seal plate provide an inward radial constraint substantially against the outer periphery of the seal plate and an axial constraint against the inner periphery of the seal plate maintaining the seal plate in compression during high centrifugal loading.

5. The turbine of claim 4 wherein inward radial constraint against the outer periphery of the seal plate is provided by a second circumferential flange extending axially from the seal plate in abutment with the underlying surface of a third circumferential flange extending axially from the rotor disc and wherein the second and third flanges include a plurality of aligned indentations therethrough to permit the flow of cooling air to the blades.

6. In an axial flow fluid turbine of the type having a rotor disc together with a plurality of circumferentially spaced apart blades having root portions retained around the periphery of the rotor disc, sealing means around the rotor periphery comprise:
   a first annular seal ring covering one side of the blade root portions and having a circumferential flange extending axially from the side thereof for engagement within a circumferential groove which extends axially into the rotor disc in substantial proximity to the outer periphery of the rotor disc;
   a second annular seal ring covering the opposing side of the blade root portions and having a second circumferential flange extending axially from the side thereof for engagement within a second circumferential groove which extends axially into the rotor disc from the side of the disc opposing the first groove, and in substantial proximity to the outer periphery of the disc;
   a first shear wire for engagement between a first circumferential canal of generally semi-circular cross-section which extends entirely around the first flange and a second circumferential canal of generally semi-circular cross-section which extends entirely around the inside surface of the first groove;
   a second shear wire for engagement between a third circumferential canal of generally semi-circular cross-section which extends entirely around the second flange and a fourth circumferential canal of generally semi-circular cross-section which extends entirely around the inside surface of the second groove;
   means for inserting the first shear wire between the first and second circumferential canals; and means for inserting the second shear wire between the third and fourth circumferential canals.

7. The turbine of claim 6 including a generally bowed conical seal plate in axially spaced relation to the turbine disc to define a plenum therebetween for receipt and direction of a flow of cooling air radially outward to the turbine blades wherein flow communication is established from the plenum to the blade root portions by means of a plurality of circumferentially spaced apart openings through the first seal ring and wherein retaining means for the seal plate provide an inward radial constraint against the outer periphery of the seal plate and an axial constraint against the inner periphery of the seal plate.

8. The turbine of claim 7 wherein inward radial constraint against the outer periphery of the seal plate is provided by a third circumferential flange extending axially from the seal plate in abutment with the underlying surface of a fourth circumferential flange extending axially from the rotor disc and wherein the second and third flanges include a plurality of aligned indentations therethrough to permit the flow of cooling air to the blade roots.

9. In an axial flow fluid turbine of the type having a rotor disc together with a plurality of circumferentially spaced apart blades disposed about the outer periphery thereof, means for directing a flow of cooling air radially outward to the blades comprise:

a generally bowed conical annular seal plate in axially spaced affixed relation to the turbine disc to define a plenum therebetween wherein the seal plate is maintained in compression during centrifugal loading by a circumferential flange extending axially from the seal plate in abutment with the underlying surface of a second circumferential flange extending axially from the rotor disc which cooperate to provide an inward radial constraint against the outer periphery of the seal plate and a shoulder formed around a sleeve connected to the turbine which abuttingly engages the seal plate providing an axial constraint against the inner periphery of the seal plate.

10. The turbine of claim 9 wherein the first and second flanges include a plurality of aligned indentations therethrough to permit the flow of cooling air to the blade roots.

* * * * *